United States Patent
Chang

(10) Patent No.: US 7,447,120 B2
(45) Date of Patent: Nov. 4, 2008

(54) METHOD OF DETERMINING AN OPTIMAL CONTROL PROFILE FOR ADJUSTING TRAY-IN/OUT SPEEDS OF AN OPTICAL DISK DRIVE

(75) Inventor: Sung-san Chang, Taipei (TW)

(73) Assignee: Lite-On It Corporation, Hsinchu (TW)

( * ) Notice: Subject to any disclaimer, the term of this patent is extended or adjusted under 35 U.S.C. 154(b) by 632 days.

(21) Appl. No.: 10/710,855

(22) Filed: Aug. 8, 2004

(65) Prior Publication Data

US 2005/0052959 A1    Mar. 10, 2005

(30) Foreign Application Priority Data

Sep. 4, 2003    (TW) .............................. 92124521 A

(51) Int. Cl.
*G11B 7/085*    (2006.01)

(52) U.S. Cl. .................................. 369/30.27; 720/617

(58) Field of Classification Search ................. 720/601, 720/602, 600; 369/30.27, 53.25
See application file for complete search history.

(56) References Cited

U.S. PATENT DOCUMENTS

| | | | | | |
|---|---|---|---|---|---|
| 5,123,005 | A | * | 6/1992 | Kurosu ....................... | 720/602 |
| 5,917,435 | A | * | 6/1999 | Kamiya et al. ......... | 340/995.26 |
| 6,005,833 | A | * | 12/1999 | Yasuma et al. .............. | 720/602 |
| 6,311,613 | B1 | * | 11/2001 | Takahashi ................... | 101/118 |
| 6,370,100 | B2 | * | 4/2002 | Koshino et al. ............. | 720/602 |
| 6,378,860 | B1 | * | 4/2002 | Gutierrez et al. ............ | 271/217 |
| 6,643,240 | B2 | * | 11/2003 | Chen ......................... | 369/53.3 |
| 2005/0204373 | A1 | * | 9/2005 | Ueno et al. .................. | 720/616 |
| 2006/0161929 | A1 | * | 7/2006 | De Hoog et al. ............ | 720/602 |

* cited by examiner

*Primary Examiner*—Tan Xuan Dinh
*Assistant Examiner*—Henok G Heyi
(74) *Attorney, Agent, or Firm*—Winston Hsu

(57) ABSTRACT

"The present invention discloses an adjusting method applicable to tray-in and tray-out speeds in optical disk drives. Firstly, a number of control profiles are set up, a tray-out operation is executed by an initial control profile, and the tray speed measured by means of sensors. If the tray speed is not acceptable, then an optimal control profile is selected from the present control profiles according to the unacceptable tray speed."

7 Claims, 3 Drawing Sheets

METHOD OF DETERMINING AN OPTIMAL CONTROL PROFILE FOR ADJUSTING TRAY-IN/OUT SPEEDS OF AN OPTICAL DISK DRIVE

BACKGROUND OF INVENTION

1. Field of the Invention

The present invention provides a method for adjusting tray-in/out speeds of a tray, and more particularly, a method of determining an optimal control profile for adjusting tray-in/out speeds of a tray in an optical disk drive.

2. Description of the Prior Art

Tray-in/out speeds of a tray in a prior art optical disk drive are constant. The prior art optical disk drive controls the tray-in/out speeds with a direct-current motor by means of an open-loop-control method. The open-loop-control method includes operations of constant voltage/current, constant control profile, etc.

The open-loop-control method is to provide tray-in/out forces for the tray according to operations of the optical disk drive.

However, considering the cost of production, the prior art optical disk drive includes merely a limit switch instead of close-loop sensors for detecting whether the tray arrives at its end-stop.

In mass production, owing to: (1) different tray-in/out forces due to variations in disk clampers, (2) inconsistency of devices with different friction forces, and (3) different ways of oil filling with different brake forces, an unique and constant control profile is not suitable for all optical disk drives.

Furthermore, improper tray-in/out speeds can cause the tray to be incapable of driving all the way to its end-stop, or to accelerate rapidly, causing an optical disk to be out of position (i.e. dropped out from the tray) with excessive force. Therefore, to prevent the above-mentioned problem, a method for control tray-in/out speeds of a tray is expected.

SUMMARY OF INVENTION

It is therefore a primary objective of the claimed invention to provide a method for adjusting tray-in/out speeds of an optical disk drive tray.

According to the claimed invention, the method of determining an optimal control profile for adjusting tray-in/out speeds of a tray in an optical disk drive including the following steps:

(a) ejecting the tray using an initial control profile;
(b) measuring tray-out speed at a plurality of points in the initial control profile;
(c) determining a plurality of comparison values derived from comparisons between the plurality of tray-out speeds of step (b) and a plurality of predetermined tray-out speeds; and
(d) determining an optimal control profile according to the comparison values of step (c).

These and other objectives of the claimed invention will no doubt become obvious to those of ordinary skill in the art after reading the following detailed description of the preferred embodiment that is illustrated in the various figures and drawings.

DETAILED DESCRIPTION

In first embodiment, a plurality of control profile sets for tray-in/out speeds of a tray in an optical disk drive are established, and an optimal control profile of the tray is thus selected by aid of pre-established sensors.

Figure 1:
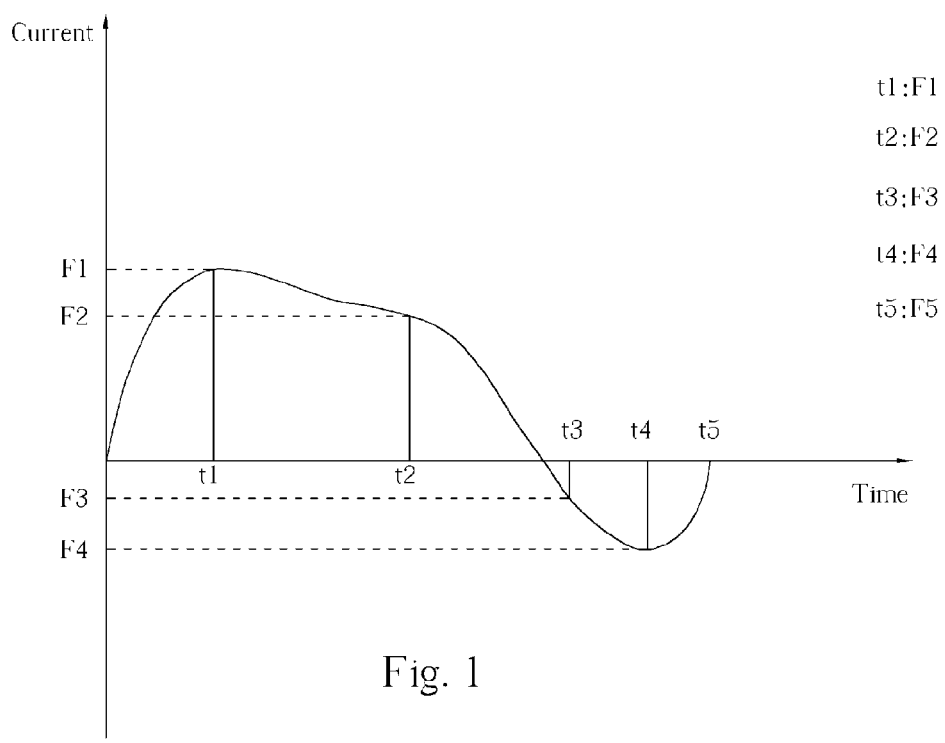
FIG. 1 illustrates a schematic diagram of driving current for a tray versus time in a control profile.

Please refer to FIG. 1, which illustrates a control profile graph of drive current for the tray versus time. If the control profile is applied to drive the tray for movement (drive tray-out for example), ejection force is provided by a positive drive current before time point $t3$. After time point $t3$, the tray has almost reached its end-stop, so a brake force is provided by a negative current to stop the tray as it approaches the end-stop.

Figure 2:
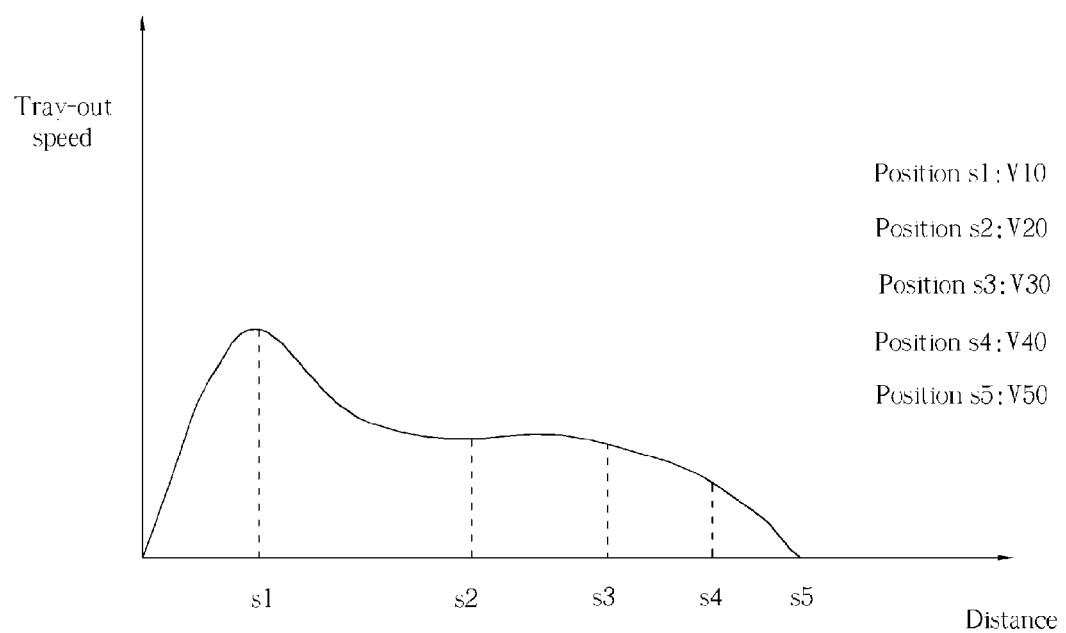
FIG. 2 illustrates a schematic diagram of tray-out speeds versus the tray-out distance of the tray.

Please refer to FIG. 2, which illustrates a graph of tray-out speeds versus the tray-out distance of the tray. The optical disk drive divides the tray-out distance into five segments with five points in addition to the origin, $s1$, $s2$, $s3$, $s4$, and $s5$, a sensor is set up in each point for determining tray-out speeds $V10$, $V20$, $V30$, $V40$, and $V50$. The tray accelerates from zero to $V10$ before point $s1$ with the initial ejection force, and then decelerates to $V20$ at point $s2$ and then to $V30$ at point $s3$; with a lowering and subsequent inversion of drive current, the tray decelerates significantly between time points $t3$ and $t5$ due to the brake force, and stops at time point $t5$.

The prior art optical disk drive with a constant control profile cannot provide optimal tray-in/out speeds of the tray, so the present invention provides a method for determining the optimal control profile.

Firstly, the optical disk drive sets a plurality of control profile sets as follows:

add1: $(F1,t1;F2,t2;F3,t3;F4,t4;F5,t5)$
add2: $(F1+\Delta F1,t1;F2,t2;F3,t3;F4,t4;F5,t5)$
add3: $(F1,t1+\Delta t1;F2,t2;F3,t3;F4,t4;F5,t5)$
add4: $(F1-\Delta F1,t1;F2,t2;F3,t3;F4,t4;F5,t5)$ The control profile set add1 is a default control profile of the optical disk drive, which means that the tray is driven with a force $F1$ at time point $t1$ in FIG. 1, and similarly, forces $F2$ to $F5$ at time points $t2$ to $t5$.

The control profile set add2 provides a force $F1+\Delta F1$ to the tray at time point $t1$, so the acceleration of the tray under control profile set add2 is higher than under control profile set add1.

Figure 3:
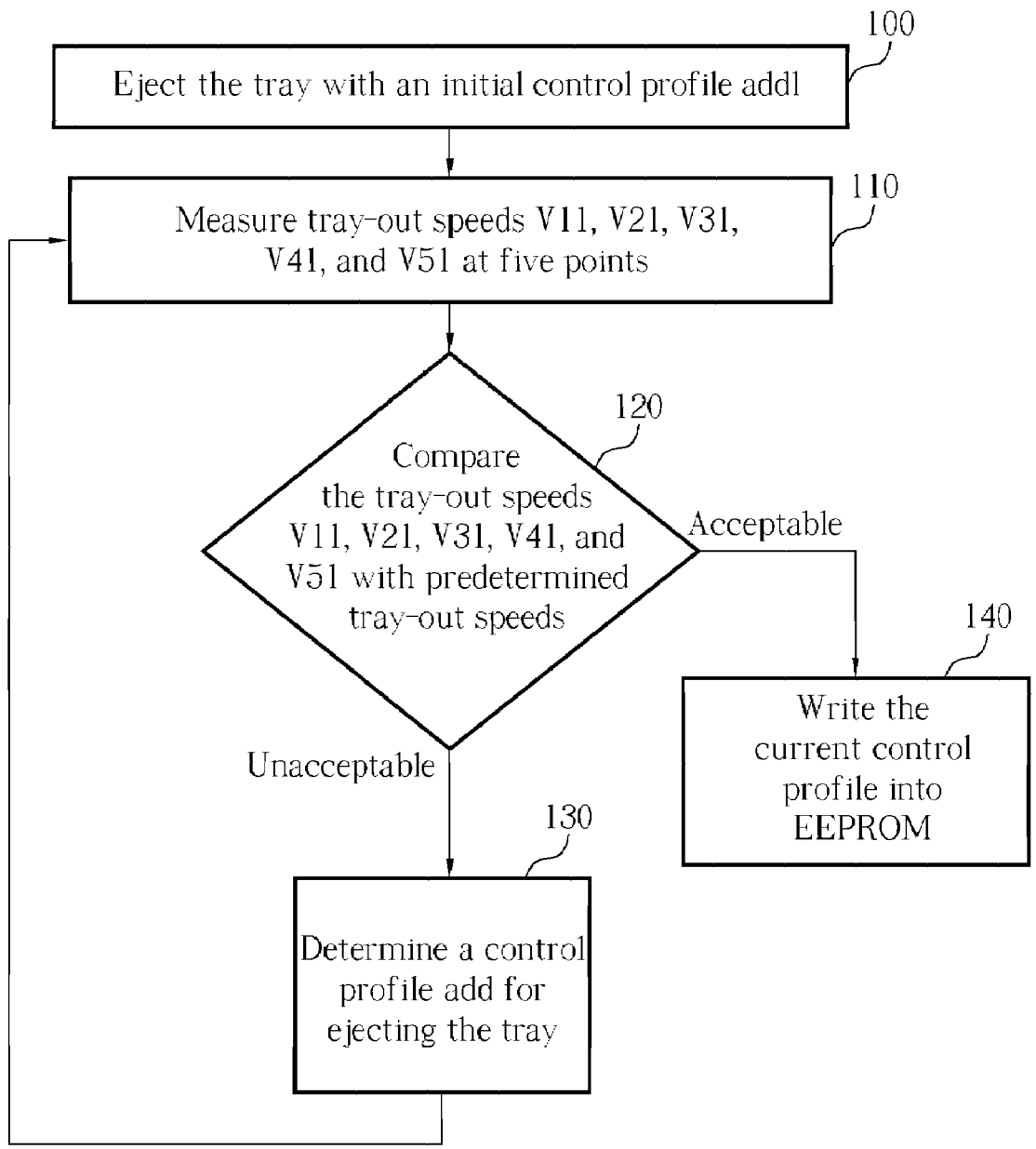
FIG. 3 illustrates a flowchart of the present invention determination of the optimal control profile.

According to the control profile sets, the optimal control profile for tray-in/out speeds of the tray can be obtained. Please refer to FIG. 3, which illustrates a flowchart of the present invention determination of the optimal control profile. The process includes:

Step 100: eject the tray with an initial control profile add1.

Step 110: measure tray-out speeds $V11$, $V21$, $V31$, $V41$, and $V51$ at five points (i.e. S1, S2~S5). With a timer and sensors set at the above points, the time duration for the tray to pass through the points can be measured and thus tray-out speeds determined.

Step 120: compare the tray-out speeds $V11$, $V21$, $V31$, $V41$, and $V51$ with predetermined tray-out speeds. If acceptable, the process undergoes step 140, or else the process undergoes step 130. The optical disk drive sets the predetermined tray-out speeds before the process. If the tray-out speeds differ from the predetermined tray-out speeds beyond a predetermined range owing to some inconsistency of the optical disk drive, the present invention will change the initial control profile according to the comparison results.

Step 130: determine a control profile add for ejecting the tray, and repeat step 110 and step 120 until the optimal control profile is obtained. In this step, if the control profile cannot provide an optimal tray-out speed for the tray, the optical disk drive will select the most proper control profile from the control profile sets according to the comparison values between the practical tray-out speeds and the predetermined tray-out speeds. For example, if V11 is higher than the predetermined tray-out speed and V21~V51 are normal, the optical disk drive selects the control profile add4, and repeats steps 110 and 120 for determining whether the control profile add4 is the optimal control profile. The process repeats steps 110 to 130 unless the optimal control profile is obtained.

Step 140: write the current control profile to EEPROM. In this step, the most proper control profile is written or overwritten (if EEPROM exits a control profile) into EEPROM of the optical disk drive, which generally stores an operating control profile.

The above-mentioned steps are taken before the optical disk drive leaves a factory, so as to provide the proper (optimal) control profile according to a particular type of optical disk drive. The present invention can also determine the optimal control profile according to tray-in speeds of the tray, or according to both tray-in and tray-out speeds of the tray.

The present invention can be utilized not only in production, but also for a user to determine the control profile with applied software, or to select a preferred control profile from a plurality of predetermined control profile sets (such as fast, slow, and medium modes) using the applied software for adjusting tray-in/out speeds.

In addition to tray driving systems, in another embodiment, the present invention can also adjust opening/closing speeds of a motor-driven cover (such as a CD-Player with the cover) with the above-mentioned process.

Therefore, the advantage of the present invention is the ability to adjust tray-in/out speeds of a tray in an individual optical disk drive, so as to provide optimal tray-in/out speeds thus solving the prior art problems, i.e. inability in driving the tray to its end-stop, or rapid acceleration causing an optical disk to be dropped out from the tray with excessive force.

Furthermore, another advantage is that a user can adjust the tray-in/out speeds according to individual preference. That is, when the user feels that the tray is too fast in bringing an optical disk to a particular position, the user can force the optical disk drive to adjust tray-in/out speeds automatically with applied software, or select a control profile for determining optimal tray-in/out speeds.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of determining an optimal control profile for adjusting tray-in/out speeds of a tray in an optical disk drive, comprising:
    setting a plurality of control profile sets;
    driving the tray for movement with a control profile among the control profile sets;
    measuring a plurality of tray speeds of the tray when achieving a plurality of predetermined points in the control profile;
    determining a plurality of comparison values according to the plurality of tray speeds and a plurality of predetermined tray speeds;
    checking if the control profile is acceptable or not according to the comparison values;
    if acceptable, setting the control profile as the optimal control profile; and
    if not acceptable, determining a next control profile among the control profile sets according to the comparison values and going to the driving step.

2. The method of claim 1, wherein the optical disk drive divides tray movement distance of the tray into a plurality of segments with the predetermined points; the optical disk drive further comprising a plurality of sensors operative to measure the speed of the tray corresponding to the predetermined points.

3. The method of claim 2, wherein tray speeds are calculated according to lengths of the segments and durations of the tray passing through the segments.

4. The method of claim 1, wherein the comparison values are determined according to differences between the tray speed and the predetermined tray speed.

5. The method of claim 1, wherein the optimal control profile is determined by selecting one from a plurality of preset control profiles.

6. The method of claim 1, wherein the movement of the tray is tray-in.

7. The method of claim 1, wherein the movement of the tray is tray-out.

* * * * *